United States Patent
Lee et al.

(10) Patent No.: US 8,996,273 B2
(45) Date of Patent: Mar. 31, 2015

(54) ANTICIPATORY CRUISE CONTROL

(75) Inventors: Jin-Woo Lee, Rochester Hills, MI (US); Shilpa Prabhuswamy, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 140 days.

(21) Appl. No.: 13/600,453

(22) Filed: Aug. 31, 2012

(65) Prior Publication Data

US 2014/0067226 A1    Mar. 6, 2014

(51) Int. Cl.
*G06F 17/00* (2006.01)
*G01C 21/20* (2006.01)

(52) U.S. Cl.
CPC .................... *G01C 21/20* (2013.01)
USPC ........................................... 701/96

(58) Field of Classification Search
CPC ........... F16H 2061/0087; F16H 59/66; B60W 2550/143; G01C 21/26; G01C 21/20
USPC .................. 705/58, 65, 93, 96, 409, 412, 431
See application file for complete search history.

(56) References Cited

U.S. PATENT DOCUMENTS

| | | | |
|---|---|---|---|
| 6,161,072 A | 12/2000 | Clapper | |
| 7,400,963 B2 | 7/2008 | Lee et al. | |
| 2002/0173881 A1* | 11/2002 | Lash et al. | 701/1 |
| 2003/0093209 A1* | 5/2003 | Andersson et al. | 701/93 |
| 2003/0204299 A1 | 10/2003 | Waldis et al. | |
| 2007/0050130 A1* | 3/2007 | Grimm et al. | 701/208 |
| 2007/0078584 A1 | 4/2007 | Nakamura et al. | |
| 2008/0078600 A1 | 4/2008 | Inoue et al. | |
| 2009/0300067 A1* | 12/2009 | Denaro | 707/104.1 |
| 2010/0198450 A1* | 8/2010 | Shin | 701/29 |
| 2011/0098922 A1* | 4/2011 | Ibrahim | 701/208 |
| 2011/0313647 A1* | 12/2011 | Koebler et al. | 701/123 |
| 2012/0245756 A1* | 9/2012 | Cooprider et al. | 701/1 |

FOREIGN PATENT DOCUMENTS

WO    WO 2006/107267 A1    10/2006
WO    WO 2008/059384 A2    5/2008

* cited by examiner

*Primary Examiner* — Mary Cheung
(74) *Attorney, Agent, or Firm* — Mark S. Cohen; Pearl Cohen Zedek Latzer Baratz LLP

(57) ABSTRACT

An anticipatory cruise control configured to automatically adjust travel speed responsively to upcoming changes in road conditions in a safe and comfortable manner.

16 Claims, 8 Drawing Sheets

ANTICIPATORY CRUISE CONTROL

BACKGROUND

The present invention relates generally to vehicular cruise control and, specifically, to enhancing cruise capability by automatically adjusting travel speed in anticipation to upcoming changes in road conditions in a safe and comfortable manner even in situations lacking adequate road or GPS data.

BRIEF DESCRIPTION OF THE DRAWINGS

The subject matter regarded as the invention is particularly pointed out and distinctly claimed in the concluding portion of the specification. The features, method of operation, primary components, and advantages of the present anticipatory cruise control may best be understood by reference to the following detailed description and accompanying drawings in which:

DETAILED DESCRIPTION

The following non-limiting detailed description sets forth it should be appreciated that methods, procedures, and components well-known to those skilled in the art have not described for the sake of clearly setting forth the non-limiting features enabling embodiments of the present invention.

Generally speaking, non-limiting embodiments of the present invention are directed at enhancing vehicular cruise control by in the following manner:
Automatically modifying cruising speed responsively to upcoming changes in road conditions in a gradual, safe, and comfortable manner.
Integrating driver-selected speeds with speeds set automatically based on map data.
Providing back-up measures to ensure such functionality during times of inadequate map data or lost global positioning system (GPS) signals.

The following definitions will be used throughout the document:

"Adaptive Cruise Control (ACC)" refers to a cruise control configured to automatically adjust the vehicle speed to maintain a predefined headway behind a lead vehicle while maintaining a selected cruise speed.

"Speed-command-generator" refers to an add-on or retrofit device to the ACC. The speed-command-generator is configured to supply the ACC with a speed command reflecting upcoming road conditions.

"Anticipatory cruise control unit" refers to the combination of the ACC and speed-control generator.

"Speed provider" refers to a functional unit of the speed-command-generator directed at securing speed data to be used in automatically setting travel or cruise speeds.

"Auto-set speed", "automatically-set speed", and "automatically-selected" speed all refer to a travel speed set automatically based on map data or map data combined with an offset speed derived from a user-selected speed.

"Speed-control unit" refers to a functional unit of the speed-command-generator directed at selecting a single transition speed to be supplied to the ACC as a speed command. The speed-control unit includes additional functionality as will be discussed.

"Driver-selected speed" refers to a speed manually input into the Speed-command-generator through a human-machine-interface (HMI).

"Map data" refers to digital data stored in a data base.

"MAP" is an acronym referring to the system providing data regarding road profiles or road conditions. For the purposed of this document, "map data", "MAP" data, and "road map data" are used interchangeably.

"Curve speed" refers to the optimal speed at which a curve should be negotiated.

"Offset speed" refers to a speed deviation between a prevailing speed limit at the time a drive selected a desired cruise speed and driver-selected speed itself. This deviation may be either exceed or be less than the speed limit and is maintained during speed changes, according to embodiments.

It should be appreciated that speed-command-generator has application in many types of terrestrial vehicles like, inter alias, cars, truck, motorcycles, and bicycles.

Figure 1:
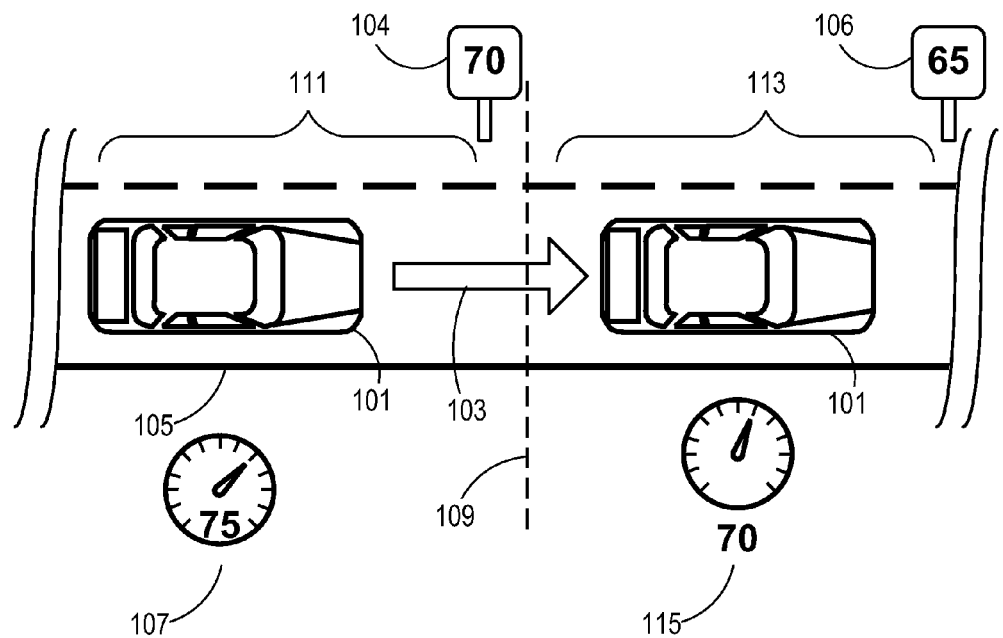
FIG. 1 is a schematic depiction of a vehicle traveling at automatically-selected speeds based on speed limit data for each respective road segment, according to embodiments.

Turning now to the figures, FIG. 1 is a schematic depiction of a vehicle configured to automatically set its travel speed on the basis of digital map data associated with a road segment within which the vehicles is identified to be traveling by GPS, according to embodiments. The vehicle is further configured to receive driver-selected speeds through a human-machine-interface (HMI). As noted above, the deviation of the user-selected speed from the prevailing speed limit defines an offset speed. According to non-limiting embodiments, when the vehicle changes its travel speed automatically on the basis of the map data, it preserves predefined offset speed. It should be appreciated that automatically-selected speeds based on curve data derived from the map data for the upcoming segments may also be employed, according to certain embodiments.

As shown, road 105 traversing state border 109 is divided into two road segments 111 and 113 on the basis of the change in speed limit. Road segment 111 has a speed limit of 70 m.p.h. as indicated by speed sign 104 and road section 113 has a speed limit of 65 m.p.h. as displayed by road sign 106. In this example, a driver has chosen a user-selected speed having an offset speed of 5 m.p.h. above the prevailing speed limit along road segment 111. The travel speed changes automatically as vehicle traverses border 109 in accordance with the relevant speed limit while maintaining the offset value of 5 m.p.h. above the speed limit set in road segment 111; consequently, vehicle 105 travels at a speed of 70 m.p.h. in road segment section 113.

Figure 2:
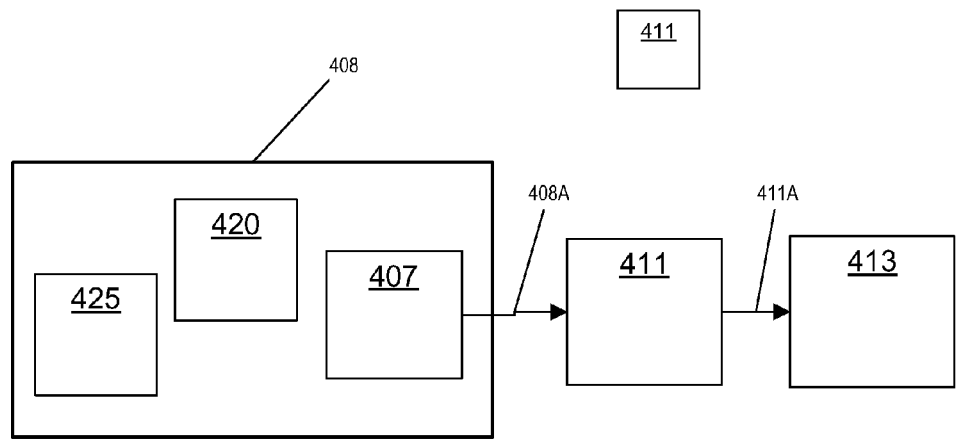
FIG. 2 is a general block diagram depicting the relationship of the automatic speed-set system with an adaptive cruise control (ACC) and engine control module (ECM), according to embodiments.

FIG. 2 is a general block diagram depicting the functional context within which the present invention operates and the primary functional modules, according to embodiments.

Specifically, speed-command-generator 408 supplies a speed command 408A to ACC 411 that after processing outputs the appropriate acceleration and toque commands 411A to engine control module 413, according to embodiments. Speed command 408A is implemented so as to be compatible with a large range of ACC types. In this manner, the speed-command-generator may be implemented as an add-on module or retrofit unit to existing adaptive cruise control units or implemented as an integral unit to an anticipatory cruise control unit.

Speed-command-generator 408 may include three primary modules; a speed provider 425, an automatic speed set module 420 for generating speed profiles from speed options received from the speed provider 425, and a speed command module 407 for choosing a single speed to be used as a speed command supplied to the ACC.

The speed provider 425 may receive a driver or user-selected speed through an HMI, as noted above, or from a data base of map data and GPS signal to identify the relevant map data as the location of the vehicle advances along a road.

The automatic-speed-set module 420 processes the speed data received from speed provider to generate different speed options as will be further discussed.

Figure 3:
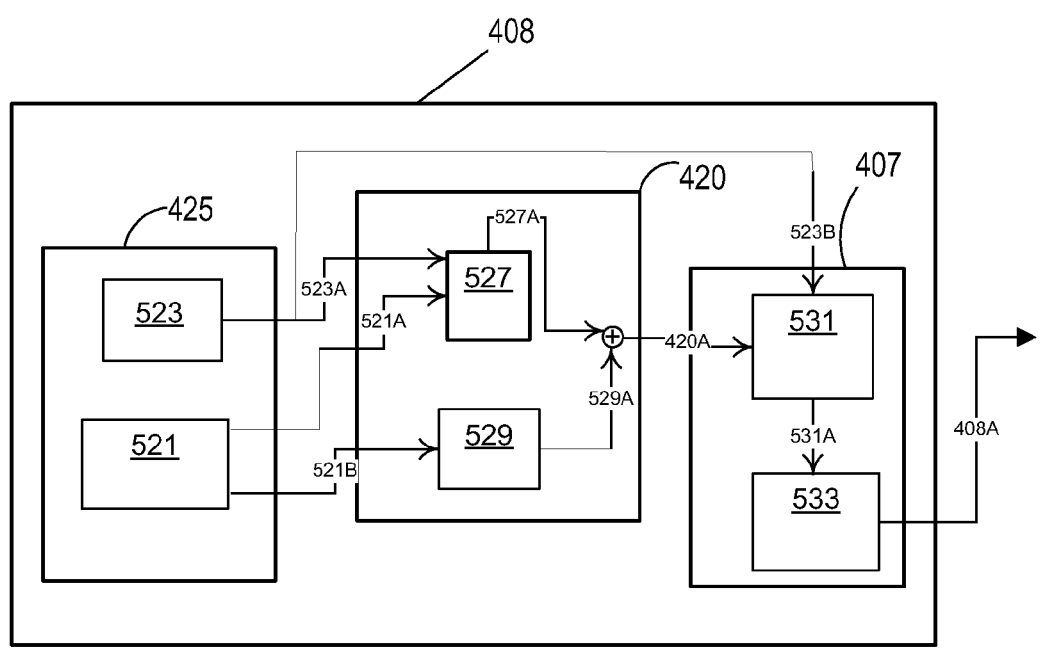
FIG. 3 is block diagram of a speed-command generator with the associated sub-modules and associated data flow, according to embodiments.

Speed command module 407 further process the various speed options received from the automatic-speed-set module 420 to assess which of the speed options is the safest and most comfortable speed and sends accordingly sends a speed command 411A FIG. 3 is block diagram of the primary modules, their respective sub-modules of the speed-command-generator 408, and their associated data flow.

Specifically, the speed-command-generator 408 includes HMI 523 and map data base 521 as noted above. Automatic speed set module 420 includes a speed-offset calculator 527 for calculating offset speeds from user-selected speeds received from HMI 523 and speed profile generator 529 for generating auto-select speeds 529A that could be rendered into the transition speeds 408A (after additional processing) and supplied to the ACC 411 as speed commands. Speed command module 407 includes an arbitration module 531 for selecting a speed option deemed to be the safest and safety logic module 533 for ensuring that forces generated during speed changes do not exceed comfort thresholds determined during human factor studies.

During operation, driver-selected travel speed 523A is received through HMI 523 and fed to speed-offset calculator 527 to used to calculate an offset speed in view the current speed limit 521A supplied from data base 521, according to an a certain non-limiting embodiment. As noted above, offset speed may be evaluated as the deviation between the user-supplied speed 523A and the current speed limit 521B Speed profile generator 529 generates at least one potential transition speed 529A on the basis of the known position of the vehicle, map data 521B that includes upcoming speed limit data, and the distance 521B to the upcoming road segment, according to embodiments. As shown, each potential transition speed 529A generated by the speed profile generator 529 is modified with offset value 527A and output to arbitration module 531, as a speed option according to a certain embodiment.

Arbitration module 531 assesses which of the speed options, user-selected speed 521B or automatically-selected speed 420A, is deemed safest by generally selecting the lowest speed and outputting it as a reference speed to the safety module 533. It should be appreciated that under certain conditions, like when the user-selected speed is less than the speed limit, automatically-selected speed options may be chosen as the safest speed option.

A reference speed 531A is fed to safety module 533, according to embodiments, to access if the g-force generated when changing the current speed to preferred speed 531A is less than about 0.15 g-force. If so, the reference speed 531A is deemed to be the desired transition speed between the current and upcoming road segments and is supplied to the ACC as speed command 408A, according to embodiments.

However, if reference speed 531A produces a g-force exceeding the maximum allowable of about 0.15 g, a previous value of the preferred speed 531A producing an allowable g-force is supplied to the ACC 411 as speed command 408A, according to embodiments.

Figure 4:
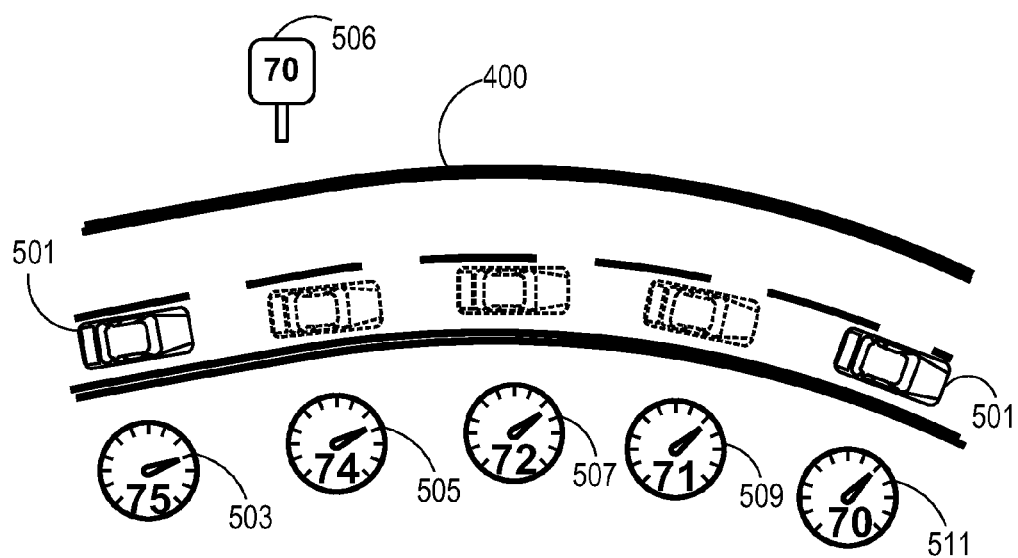
FIG. 4 is a schematic depiction of a vehicle traveling at a plurality of automatically-selected speeds based on curve speed data for each respective segment and user selected offset speed, according to embodiments.

FIG. 4 is a schematic view of vehicle 501 negotiating curve 400 at plurality of curve speeds 505-509 to ensure safe and comfortable transition throughout the curve, according to embodiments. The curve speeds are generated in accordance to road curve conditions from map data and may be employed even when the map data lacks speed limits for the curved road sections. The offset speed of 5 m.p.h. established at the beginning of the curve is maintained throughout each of the curve speeds, according to a certain embodiment. It should be appreciated that automatically-selected speeds based on speed-limit data derived from the map data for the upcoming segments may also be employed, according to certain embodiments.

Figure 5:
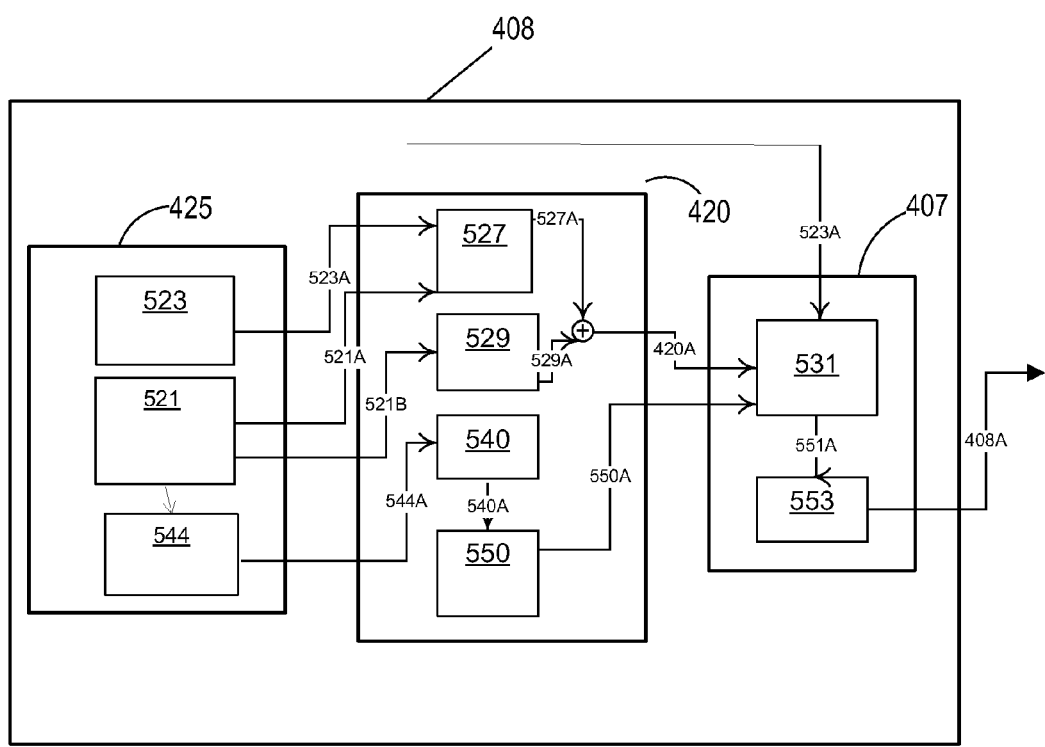
FIG. 5 is block diagram of a speed-command generator with the associated sub-modules and associated data flow providing the functionality of FIG. 4, according to embodiments.

FIG. 5 is a block diagram of the primary modules, their respective sub-modules of the speed-command-generator 408, and their associated data flow providing the functionality depicted in FIG. 4.

Specifically, the block diagram is analogous to that depicted in FIG. 3 with the exception of additional sub-modules directed at providing curve transitions speeds based on map data. It should be appreciated that map data is commercially available at NAVTEQ Corporation; 425 West Randolph Street; Chicago, Ill. 60606 USA; and online at http://corporate.navteq.com/products_data_whatis.htm.

Curvature calculator 544 determines the sharpest curvature nearest to the vehicle as a speed defining curvature 544A based on map data and outputs the values 544A to curve speed calculator 540 that calculates the desired curve speed as will be discussed. Speed profile generator 550 calculates a speed profile based on curve speeds 540A received from the curve speed calculator 540 and the current distance and velocity of the vehicle so that the vehicle achieves the desired curve speeds without blatant speed changes, according to an embodiment. It should be appreciated that alternative sources of curve data, like vehicle-to-vehicle reporting for example, may be employed in certain embodiments.

Analogously to the block diagram of FIG. 3, three potential speed velocities, the user selected speed 523A, the automatically-selected-speed 420A, and the curve-based velocity 550A are output to arbitration module 551 to determine which of the speed options is deemed to be the safest and processing proceeds as described above in regards to FIG. 3.

Figure 6:
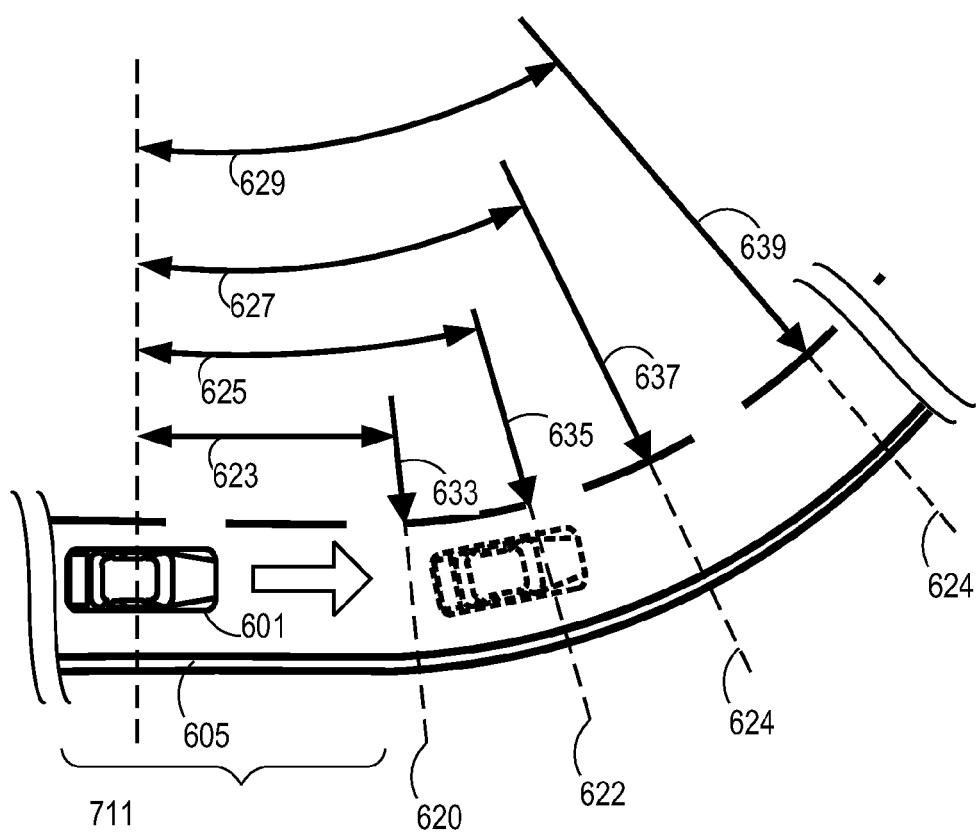
FIG. 6 is a schematic depiction of curve segments used in the calculation of curve speeds by the speed-command generator, according to embodiments.
Figure 7:
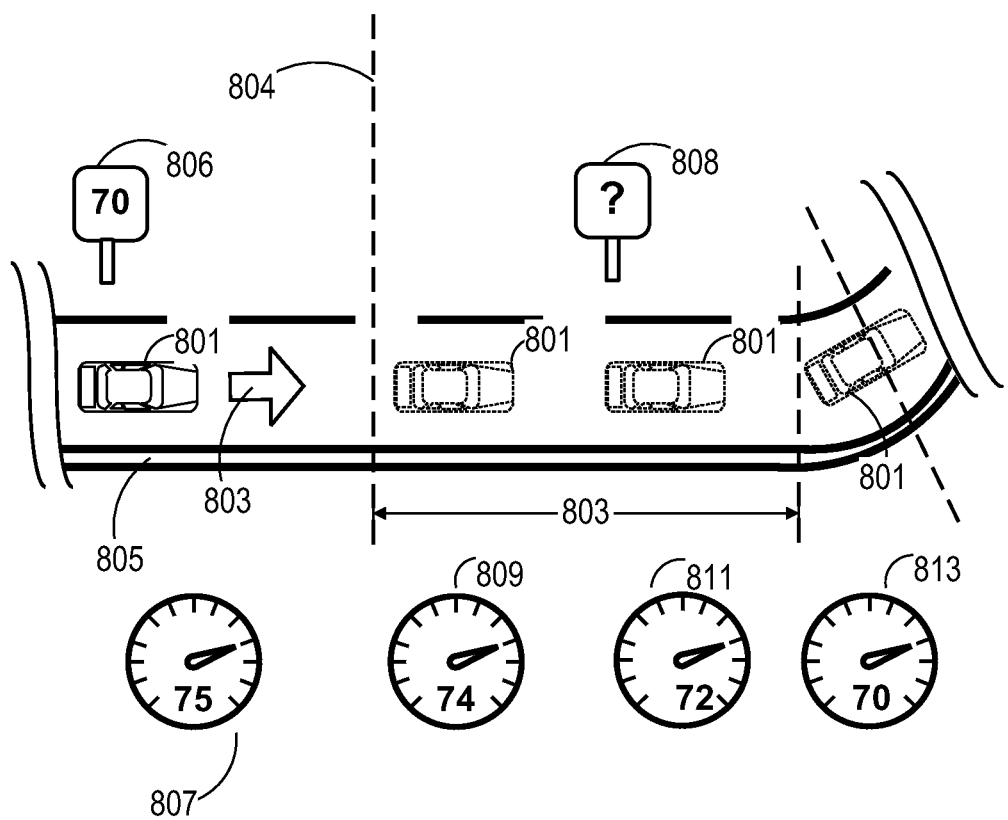
FIG. 7 is a schematic depiction of various transition speeds lacking reliable navigational or map data, according to embodiments.

FIG. 6 depicts various curvatures encountered by vehicle 601 negotiating curve 605. The curvatures are depicted as

620, 622, 624, and 626 at corresponding distances measure from line 611 traversing vehicle 601; 625, 627, and 629, respectively. The desired curve velocity may be calculated according to the following formula, according to a certain embodiment:

$$v_{des\_curve} = \sqrt{R \cdot a_{y\_lim}}$$

wherein "$a_{y\_lim}$" refers to a lateral acceleration constant; "R" refers to the radius of curvature calculated as the inverse of the curvature values. These curvature values are those calculated and used to generate the desired curve speeds as described above.

Figure 8:
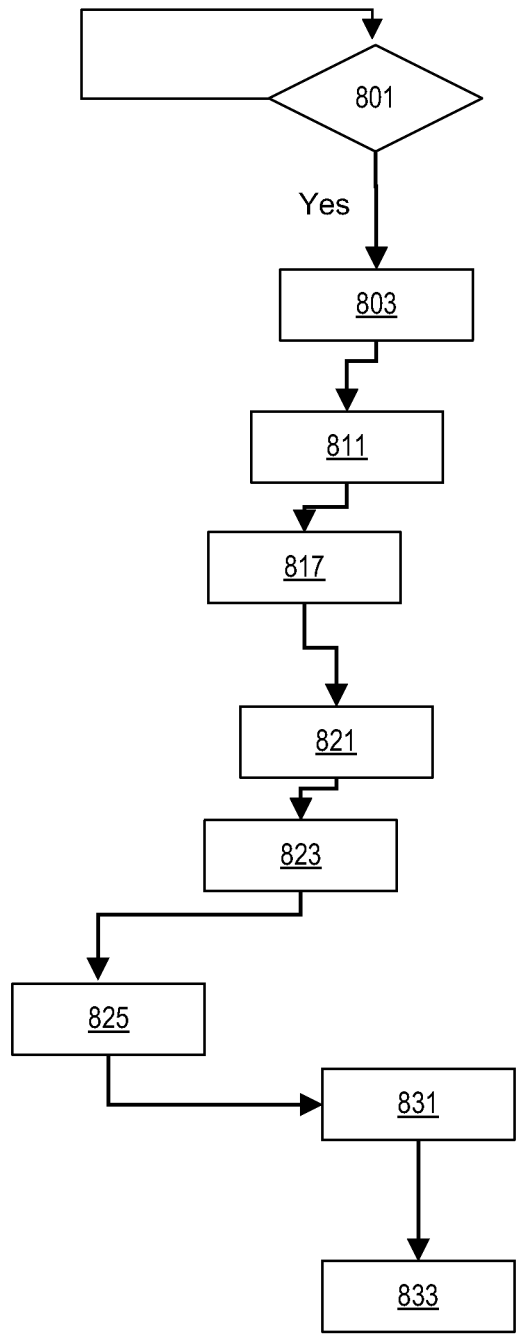
FIG. 8 is a flow chart employed by the automatic speed set system to achieve the functionality shown in FIG. 1 or 4, according to embodiments.

FIG. 8 depicts a vehicle negotiating road segments using dead-end reckoning to compensate for loss of a GPS signal or inadequate map data, according to embodiments.

Upon loss of the GPS signal or map data, speed-command-generator is configured to issue a warning signal to the driver to warn him of a potential need to take a more active role in the speed control of the vehicle.

The speed-command-generator is further configured to operate in a back-up mode employing real-end reckoning to ascertain the location of the vehicle as it advances using wheel rotation or other distance tracking means. A target speed profile is generated based on the traveled distance based on speed limit information obtained from the MAP data speed limit of the current road segment and the next road segment, and curvature data for 300-500 m of the upcoming road. Hence, the speed profile at the current road segment may be generated from the data previously received from the MAP before the GPS signal was lost, according to embodiments.

Situations in which MAP data is inadequate and GPS signal maintained, speed profiles may be generated based on MAP data for preceding road segments, according to a certain embodiment.

FIG. 8 is a non-limiting example of a flow chart of the processing employed in the speed-command-generator. In step 801 the generator verifies that ACC is engaged and when so, in step 803 receives a driver-selected speed.

In step 807, the generator automatically sets a current speed based on GPS and speed limits in map data.

In step 811, the automatically-set speed is adjusted by an offset speed derived from the driver-selected speed and speed limit data.

In step 817, upcoming curvature and speed limit data of the upcoming road are obtained from map data.

In step 821, an automatically selected travel speed is generated based on the speed limit data and offset speed for upcoming road segments.

In step 823, a travel speed profile based on curve-data is generated for upcoming road segments.

In step 825, the safest or the lowest of each set of speed options is selected as a reference speed. The speed options are the user-selected speed, the automatically-set speed, and the curve-based travel speed In step 831, the reference speed is checked for compliance with safety thresholds.

In step 833, a speed command is sent to the ACC.

Figure 9:
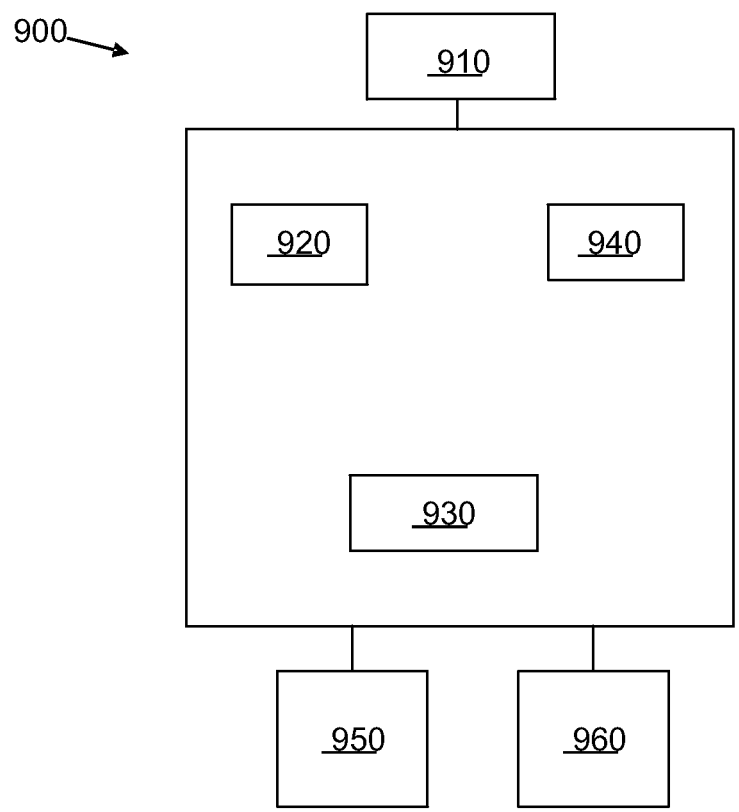
FIG. 9 is a schematic block diagram depicting hardware employed to achieve the functionality described in FIGS. 1-8, according to embodiments.

FIG. 9 is a schematic block diagram of the hardware used to implement speed-command-generator, according to an embodiment of the present invention. Speed-command-generator 900 may include one or more GPS receivers 910, processors or controllers 920, memory 930, long term non-transitory storage 940, input devices 950, and output devices 960 mounted in a vehicular platform.

Non-limiting examples of output visual and audio device such. Input devices 50 and output devices 960 may be combined into a single device.

Processor or controller 920 may be, for example, a central processing unit (CPU), a chip or any suitable computing device. Processor or controller 920 may include multiple processors, and may include general purpose processors and/or dedicated processors such as graphics processing chips. Processor 920 may execute code or instructions, for example stored in memory 930 or long term storage 940, to carry out embodiments of the present invention.

Memory 930 may be Random Access Memory (RAM), a read only memory (ROM), a Dynamic RAM (DRAM), a Synchronous DRAM (SD-RAM), a double data rate (DDR) memory chip, a flash memory, a volatile memory, a non-volatile memory, a cache memory, a buffer, a short term memory unit, a long term memory unit, or other suitable memory units or storage units. Memory 930 may be or may include multiple memory units.

Long term, non-transitory storage 940 may be or may include, for example, a hard disk drive, a floppy disk drive, a Compact Disk (CD) drive, a CD-Recordable (CD-R) drive, flash memory device. It should be appreciated that various combinations of the above storage devices are also included within the scope of the present invention and that image data, code and other relevant data structures are stored in the above noted memory and/or storage devices.

It will be appreciated that for simplicity and clarity of illustration, elements shown in the figures have not necessarily been drawn to scale and reference numerals may be repeated in different figures to indicate corresponding or analogous elements

What is claimed is:

1. A method of anticipatory cruise control (ACC) comprising:
   providing a speed-command-generator associated with a vehicle in travel;
   retrieving speed data of an upcoming road segment from a data base of map data;
   calculating a potential transition speed from a current travel speed to a future travel speed associated with the upcoming road segment based on the speed data and current position; and
   modifying the potential transition speed by a user-selected offset value, and
   supplying the potential transition speed modified with the offset value as a transition speed to the ACC.

2. The method of claim 1, wherein the speed data of an upcoming road segment includes a speed limit of the upcoming road segment.

3. The method of claim 1, wherein the speed data of an upcoming road segment includes curve data.

4. The method of claim 3, wherein the speed-command-generator is further configured to calculate the future travel speed from the curve data.

5. The method of claim 1, wherein the transition speed generates less than about 0.15 g-force during speed changes.

6. The method of claim 1, further comprising employing dead-reckoning responsively to a loss of GPS service or loss of the map data associated with the upcoming road segment.

7. The method of claim 6, further comprising issuing a warning signal responsively to a loss of GPS service or the map data associated with the upcoming road segment.

8. The method of claim 1, wherein the cruise speed is implemented as a signal compatible with most ACC units.

9. An anticipatory cruise control (ACC) comprising:
a speed-command-generator associated with a vehicle configured to:
retrieve speed data of an upcoming road segment from a data base of map data,
calculate a potential transition speed from a current travel speed to a future travel speed associated with the upcoming road segment based on the speed data and a current position; and
modify the potential transition speed by a user-selected offset value, and
supply the potential transition speed modified with the offset value as a transition speed to the ACC.

10. The anticipatory cruise control of claim 9 wherein the speed data includes a speed limit of the upcoming road segment.

11. The anticipatory cruise control of claim 9 wherein the speed data includes a curve data of the upcoming road segment.

12. The anticipatory cruise control of claim 11 wherein the speed-command-generator is further configured to calculate the future travel speed from the curve data.

13. The anticipatory cruise control of claim 9, wherein cruise speed generates less than about 0.15 g-force during speed changes.

14. The anticipatory cruise control of claim 9, wherein the processor is further configured to employing dead-reckoning responsively to a loss of GPS service or loss of the map data associated with the upcoming road segment.

15. The anticipatory cruise control of claim 14, further comprising an output device configured to issue a warning responsively to a loss of GPS signal or inadequate map data.

16. The anticipatory cruise control of claim 9, wherein the cruise speed is implemented as signal compatible with most ACC units.

* * * * *